United States Patent [19]

Madden

[11] Patent Number: 4,779,714

[45] Date of Patent: Oct. 25, 1988

[54] ORIENTER FOR TRIGGER PUMP CAP ASSEMBLIES

[75] Inventor: John J. Madden, Wayne, N.J.

[73] Assignee: PMC Industries, Hackensack, N.J.

[21] Appl. No.: 42,969

[22] Filed: Apr. 27, 1987

[51] Int. Cl.⁴ .............................................. B65G 47/24
[52] U.S. Cl. ..................................................... 198/399
[58] Field of Search ........................................ 198/399

[56] References Cited

U.S. PATENT DOCUMENTS

| | | | |
|---|---|---|---|
| 3,958,688 | 5/1976 | Sterling | 198/399 X |
| 4,149,621 | 4/1979 | Sollenberger et al. | 198/399 X |
| 4,308,943 | 1/1982 | Gierhart | 198/399 |
| 4,465,175 | 8/1984 | Caldwell | 198/399 |
| 4,479,582 | 10/1984 | Ducloux | 198/367 X |
| 4,610,345 | 9/1986 | Spreen et al. | 198/392 |

Primary Examiner—Robert J. Spar
Assistant Examiner—Cheryl L. Gastineau
Attorney, Agent, or Firm—Samuelson & Jacob

[57] ABSTRACT

An orienter accepts trigger pump cap assemblies of the type in which a trigger is spaced from a cap along the pump housing of the cap assembly, the cap assemblies being presented serially in either one of first and second front-to-back orientations, and discharges the cap assemblies in only the second one of the orientations, the orienter including a pusher member which engages the pump housing of each cap assembly, as the cap assemblies travel downstream through the orienter, and pushes laterally against each pump housing to rotate the pump housing about the cap of those cap assemblies in the first orientation to reverse the front-to-back orientation of those cap assemblies so that all of the cap assemblies emerge oriented in the second orientation.

16 Claims, 4 Drawing Sheets

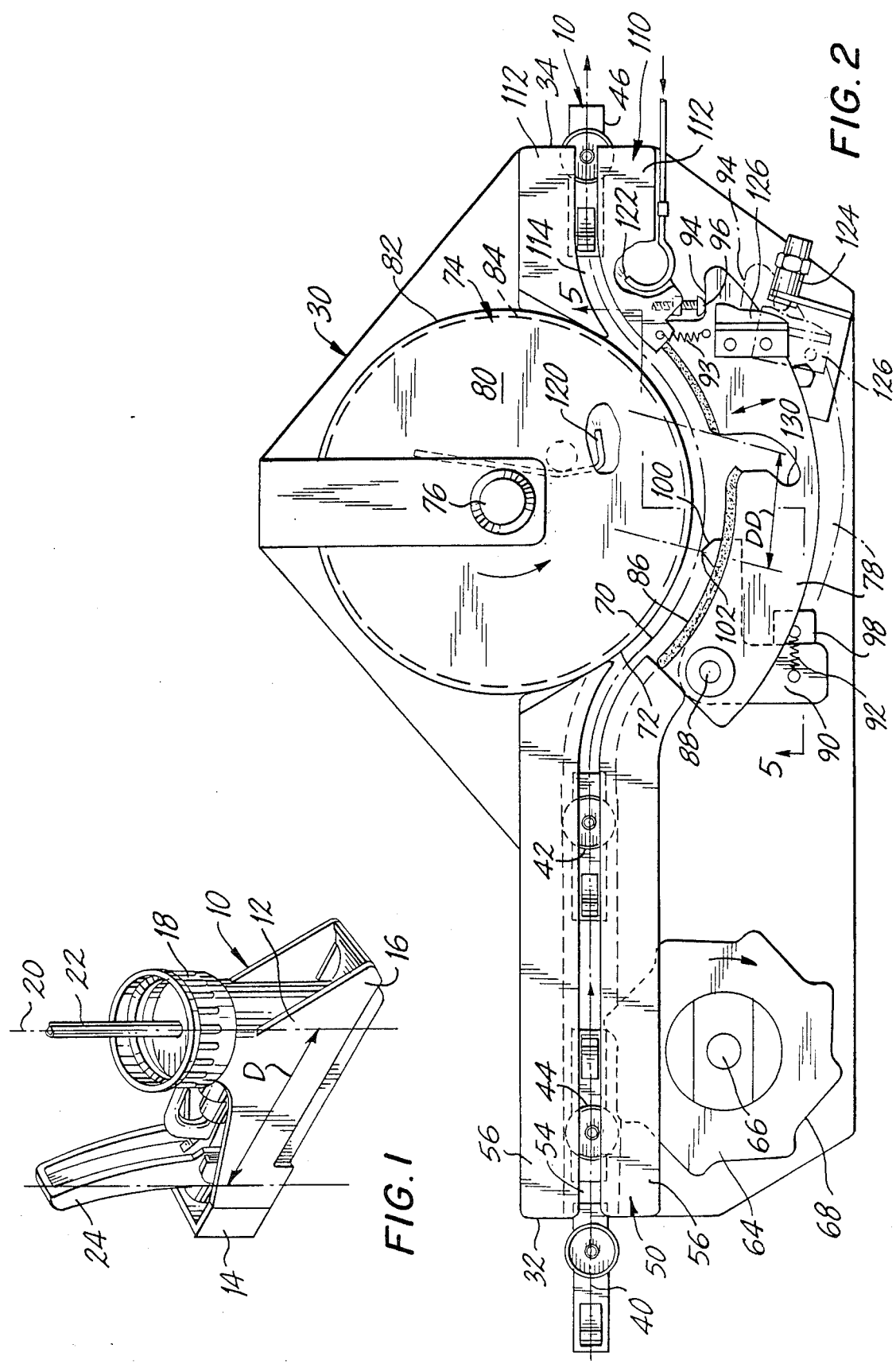

ORIENTER FOR TRIGGER PUMP CAP ASSEMBLIES

The present invention relates generally to capping operations in which filled containers are capped with trigger pump cap assemblies and pertains, more specifically, to orienting apparatus for orienting serially presented trigger cap assemblies for the capping operations.

Mechanized filling and capping of containers has reached a highly developed state. The increasing numbers of containers which must be filled and capped each year has led to the requirement for more rapid and efficient procedures and machines in order to keep pace with the demand. In addition to the large number of such operations, the configuration and construction of caps and containers continually are undergoing changes dictated by function and materials, as well as by aesthetic considerations, and such changes have required concomitant developments in the methods and apparatus for handling the caps and containers.

More particularly, the recent increased popularity of manually-operated trigger pump cap assemblies has brought about a need for handling these cap assemblies in greater numbers and with increased efficiency. Many of the trigger pump cap assemblies currently in use are constructed largely of molded synthetic resin components and are designed in a variety of shapes and sizes. These factors raise problems in handling the cap assemblies when it becomes necessary to deliver the cap assemblies serially, in rapid succession, appropriately aligned and oriented for capping operations.

Apparatus and method for orienting and delivering trigger pump cap assemblies are disclosed in U.S. Pat. No. 4,610,345. In that arrangement, the discharged cap assemblies are presented serially in a prescribed alignment and vertical orientation, but are in random front-to-back orientation.

The present invention provides orienting apparatus for accepting trigger pump cap assemblies presented serially, in random front-to-back orientation, and for delivering the cap assemblies in a desired uniform front-to-back orientation for further capping operations, and presents several objects and advantages, some of which may be summarized as follows: Effective handling of the trigger pump cap assemblies so as to facilitate the delivery of the cap assemblies serially, in rapid succession, appropriately aligned and oriented front-to-back for capping operations; suitability for use with the particular configurations and materials utilized in current trigger pump cap assemblies; capable of orienting trigger pump cap assemblies with increased rapidity and efficiency, utilizing the available characteristics of the cap assemblies themselves as a basis for manipulating the cap assemblies; capable of operation with reduced incidents of jamming and consequent interruption of the supply of correctly oriented cap assemblies; the ability to orient cap assemblies having configurations heretofore difficult to orient with sufficient rapidity to render practical the mechanized handling of such cap assemblies; compactness in design and layout to minimize production space requirements; increased simplicity leading to reduced costs in production and in maintenance of capping machinery; the ability to handle a variety of trigger pump cap assembly configurations, thereby encouraging the design and development of further innovative trigger pump cap assemblies.

The above objects and advantages, as well as further objects and advantages are attained by the present invention which maybe described briefly as an orienter for accepting trigger pump cap assemblies of the type in which a pump housing carries a cap intermediate the front and back ends of the pump housing and a trigger projecting altitudinally from the pump housing at a location spaced longitudinally away from the cap a given longitudinal distance along the pump housing toward the front end of the pump housing, the cap assemblies being presented serially along a prescribed path of travel and oriented randomly in either one of first and second front-to-back orientations, and discharging the cap assemblies in only the second of the orientations, the orienter comprising: guide means for guiding the cap assemblies along the path of travel, the guide means including guide channel means for receiving the cap and the trigger therein to guide the cap and the trigger along the path of travel; a pusher member projecting transverse to the guide channel means in a first transverse direction toward the path of travel, at a first location along the path of travel; a slot extending transverse to the guide channel means in a second transverse direction away from the path of travel and communicating with the guide channel means at a second location along the path of travel; biasing means biasing the pusher member in the first transverse direction into the path of travel at the first location to engage the pump housing of each cap assembly and urge the pump housing in the first transverse direction such that upon the arrival at the second location of the trigger of a cap assembly presented in the first orientation, the cap of that cap assembly will be confined within the guide channel means while the pusher member will move the pump housing transversely to displace the trigger in the second transverse direction into the slot, thereby enabling the pump housing to pivot about the cap until the cap assembly is re-oriented into the second orientation.

The invention will be understood more fully, while still further objects and advantages will become apparent, in the following detailed description of a preferred embodiment illustrated in the accompanying drawing, in which:

FIG. 1 is a perspective view of a trigger pump cap assembly to be oriented in the orienter of the present invention;

FIG. 2 is a top plan view of an orienter constructed in accordance with the invention;

Figure 3:
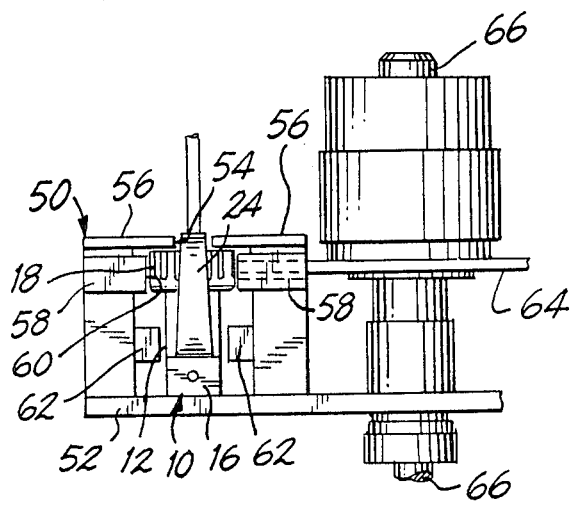
FIG. 3 is an elevational view of the input end of the orienter.
Figure 4:
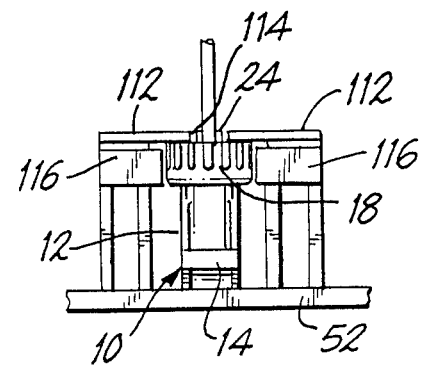
FIG. 4 is a elevational view of the discharge end of the orienter.
Figure 5:
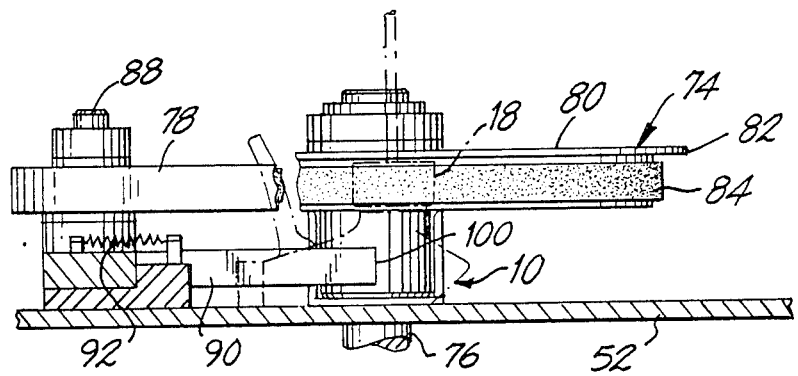
FIG. 5 is a cross-sectional view taken along line 5—5 of FIG. 2.

Referring now to the drawing, and especially to FIG. 1 thereof, a trigger pump cap assembly of the type to be oriented by the apparatus of the present invention is shown at 10. Cap assembly 10 includes a pump housing 12 which extends longitudinally between a spray head 14 at one end (the front end) and a tail portion 16 at the other end (the back end). Intermediate the front and back ends of the pump housing 12 is a cap 18 which is rotatable relative to pump housing 12, about axis 20, to enable cap 18 to be screwed onto the complementary threaded neck of a bottle (not shown) to be closed with cap assembly 10 while pump housing 12 remains stationary. A dip tube 22 extends along axis 20 and will be inserted into the bottle. A trigger 24 projects from the pump housing 12, generally parallel to the direction of axis 20 and spaced from the axis 20, and cap 18, to be located on the pump housing 12 a given longitudinal distance D from axis 20.

Turning now to FIGS. 2, 3, 4 and 5, an orienter 30 is constructed in accordance with the invention for receiving cap assemblies 10 presented serially in random front-to-back orientation at the input end 32 of the orienter 30 and delivering the cap assemblies at a discharge end 34, each in the desired orientation. Thus, cap assemblies 10 travel along a path of travel 40 with the pump housing 12 aligned longitudinally along the path of travel 40 and arrive at input end 32 in either one of two orientations, namely, with the trigger 24 trailing the cap 18, as seen at 42, or with the trigger 24 leading the cap 18, as seen at 44. Upon delivery of the cap assemblies 10 at the discharge end 34, all of the cap assemblies 10 will be oriented in the desired orientation, which is the first of the above-mentioned orientations, with the trigger 24 trailing the cap 18, as seen at 46. In order to facilitate travel of the cap assemblies 10 along the path of travel 40 through orienter 30, the orienter 30 preferably is tilted so that input end 32 is higher than discharge end 34, enabling the force of gravity to assist in moving the cap assemblies along the path of travel 40. The uniformly oriented cap assemblies 10 then travel on to be united with the bottles.

Orienter 30 accomplishes uniform orientation of the serially presented cap assemblies 10, as follows. As the cap assemblies travel longitudinally along path of travel 40, the cap assemblies 10 enter an input track 50, with the pump housing 12 of each cap assembly 10 supported upon a base plate 52 and the trigger 24 projecting altitudinally, in this instance upwardly, and guided along the path of travel 40 by a guide channel 54 which includes a guide rail 56 at either side of the path of travel 40 establishing the guide channel 54 between the guide rails 56. A second pair of guide rails 58 is located altitudinally below the first guide rails 56 and establishes a second guide channel 60 within which caps 18 are confined laterally so as to follow the path of travel 40. Auxiliary rails 62 further aid in guiding the cap assemblies 10 along the path of travel 40 by providing lateral boundaries adjacent pump housings 12. A metering star wheel 64 is rotated about a generally vertical shaft 66 and includes a pocketed periphery 68 which intercepts the path of travel 40 to meter the serially traveling cap assemblies 10, in a now well-known manner, as the cap assemblies 10 travel downstream along the path of travel 40.

Further downstream, each cap assembly is presented to a segment 70 of path of travel 40 through which those cap assemblies 10 which already are in the desired orientation pass without re-orientation, while those cap assemblies 10 which are not in the desired orientation, are re-oriented into the desired orientation. Metering star wheel 64 assures that only one cap assembly 10 at a time traverses segment 70. Segment 70 is arcuate and is bounded by the periphery 72 of a drive wheel 74 rotated continuously by a central drive shaft 76 upon which drive wheel 74 is mounted, and an arcuate outer section 78. Drive wheel 74 includes a guide plate 80 which provides a guide edge 82 for the trigger 24 of each cap assembly 10. Beneath guide plate 80 is a drive surface 84 recessed radially inwardly from guide edge 82 and located altitudinally for engaging the cap 18 of each cap assembly 10, as seen in phantom in FIG. 5. Drive surface 84 may be of an elastomeric material so as to grip each cap 18 as the corresponding cap assembly 10 traverses segment 70 of path of travel 40.

Outer section 78 includes an arcuate guide surface 86 laterally opposite the drive surface 84 so that each cap 18 will travel between the drive surface 84 and guide surface 86 as the corresponding cap assembly 10 traverses segment 70 of path of travel 40. Guide surface 86 also may be of an elastomeric material so that caps 10 will be driven by drive surface 84 and will roll along guide surface 86 as cap assembly 10 moves along segment 70. Both the drive wheel 74 and the outer section 78 are elevated altitudinally away from the base plate 52. Outer member 78 is mounted for pivotal movement upon pivot pin 88. A lever 90 also is pivoted on pivot pin 88, beneath outer section 78. A first helical spring 92 biases lever 90 in a counter-clockwise direction, as viewed in FIG. 2, and a second helical spring 93 urges outer section 78 inwardly, toward drive wheel 74, into the inner position shown in FIG. 2 wherein a stop shoulder 94 on outer section 78 engages a stop pad 96 to maintain the outer member 78 at the inner position. Lever 90 is maintained at the inner position thereof by abutment against a block 98.

Figure 6:
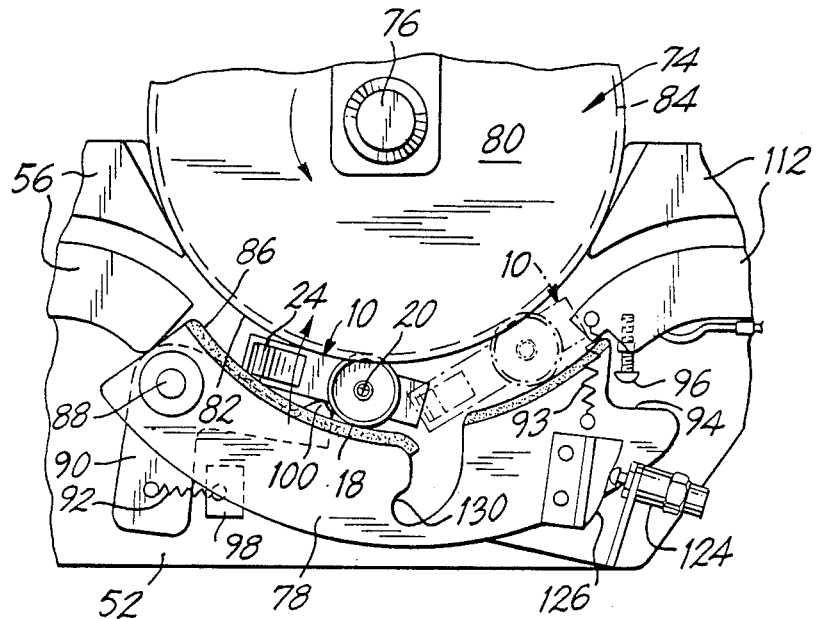
FIG. 6 is fragmentary view of a portion of FIG. 2, with component parts in another operating position.

Lever 90 carries a pusher member 100 which projects into segment 70 of path of travel 40 when the lever 90 is in the inner position shown in FIG. 2. Pusher member 100 is located longitudinally at a prescribed location 102 along segment 70 and altitudinally between outer section 78 and base plate 52 and is at an elevation corresponding to the elevation of the pump housing 12 of each cap assembly 10 which traverses segment 70. Thus, as seen in FIG. 6, as a cap assembly 10 travels along segment 70, pump housing 12 will engage pusher member 100 and pusher member 100 will be displaced outwardly. Outer section 78 also will be displaced outwardly by cap 18, the inward bias of spring 93 assuring that cap 18 is gripped between guide surfaces 84 and 86. If the cap assembly 10 is in the desired orientation, namely, with the trigger 24 trailing the cap 18, as shown in FIG. 6, the tail portion 16 of the pump housing 12 will be urged inwardly by engagement of the pusher member 100 with the tail portion 16, as the cap 18 engages the drive surface 84 of drive wheel 74, and trigger 24 will swing outwardly toward guide surface 86. At the same time, outer section 78 pivots outwardly somewhat to facilitate the passage of cap assembly 10 while keeping a firm grip on cap 18. As the cap assembly 10 continues along segment 70, axis 20 will pass location 102 and pusher member 100 will tend to rotate pump housing 12 in a clockwise direction around axis 20, bringing trigger 24 into engagement with guide edge 82 of guide plate 80. Trigger 24 is thus biased against guide plate 80 until cap assembly 10 passes beyond pusher member 100, as seen in phantom in FIG. 6, at which point cap assembly 10 will continue along segment 70 toward discharge end 34.

As each cap assembly 10 leaves segment 70, the cap assembly 10 will enter an exit guide track 110 which includes upper guide rails 112 defining a guide channel 114 for the triggers 24 and lower guide rails 116 defining a further guide channel 118 for the caps 18. Air jets 120 and 122 assist in driving the cap assemblies 10 through the guide track 110 to be discharged at discharge end 34. Should any cap assemblies 10 become jammed along segment 70, outer section 78 will be forced by the jam to pivot outwardly still further, to the outwardly pivoted position shown in phantom in FIG. 2. Such a condition will be detected by a safety switch 124 actuated by an actuator 126, placed on outer section 78, when the outer section 78 is in the further outwardly pivoted position, to discontinue operation of the orienter 30 until the jammed condition can be cleared.

Figure 7:
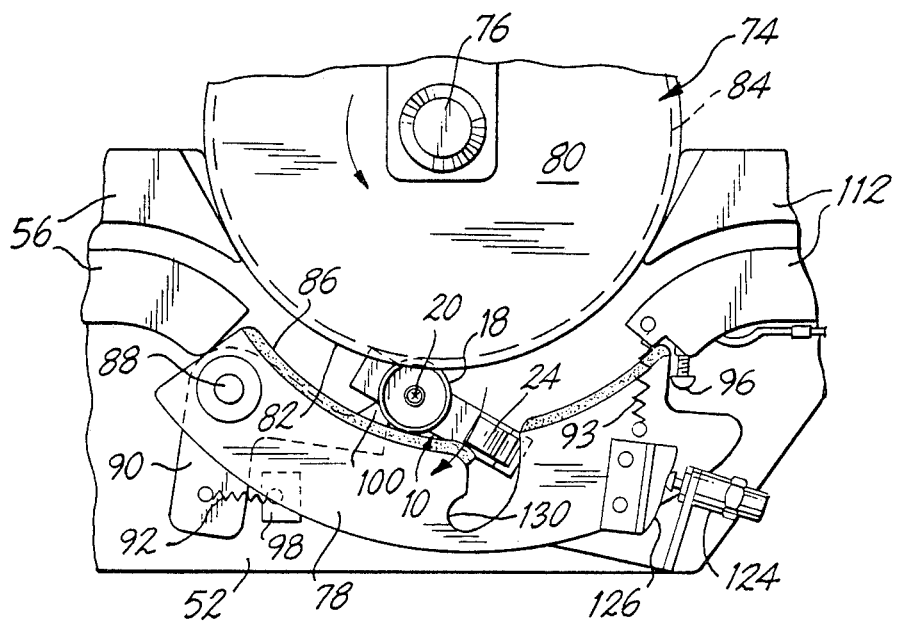
FIG. 7 is a fragmentary view similar to FIG. 6, but with a trigger pump cap assembly in an opposite orientation.

When a cap assembly 10 arrives at segment 70 in the opposite orientation, that is with trigger 24 leading cap 18, as illustrated in FIG. 7, the cap assembly 10 is re-oriented before leaving segment 70 so that all cap assemblies 10 leaving segment 70 will be oriented with trigger 24 trailing cap 18. Re-orientation is accomplished as follows: Pump housing 12 first will be engaged by pusher member 100 at spray head 14, thereby tending to rotate pump housing 12 in a counter-clockwise direction and biasing trigger 24 into engagement with guide edge 82 of guide plate 80. At the same time, outer segment 78 will be displaced outwardly. As cap 18, and axis 20, pass pusher member 100, pusher member 100 will engage pump housing 12 behind axis 20 and then will tend to rotate pump housing 12 in a clockwise direction, urging trigger 24 outwardly away from guide plate 80 and toward outer section 78. A curved slot 130 is placed in outer section 78 at a location spaced downstream from pusher member 100 by a distance DD along the segment 70 of path of travel 40. Distance DD is slightly greater than the distance D between the axis 20 and trigger 24 so that trigger 24 will enter slot 130 when pusher member 100 is just upstream of axis 20.

Figure 8:
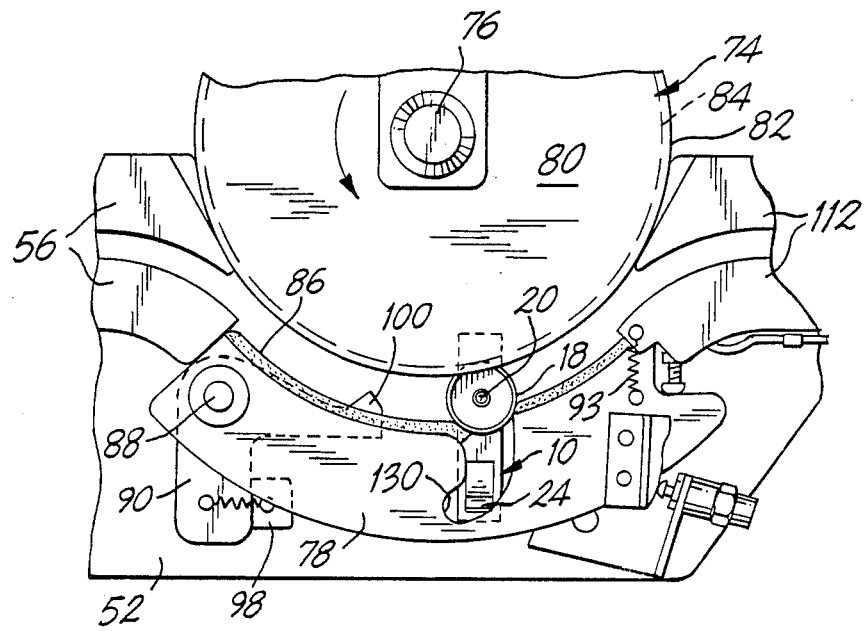
FIG. 8 is a fragmentary view similar to FIG. 7, but with the illustrated component parts in another operating position.
Figure 9:
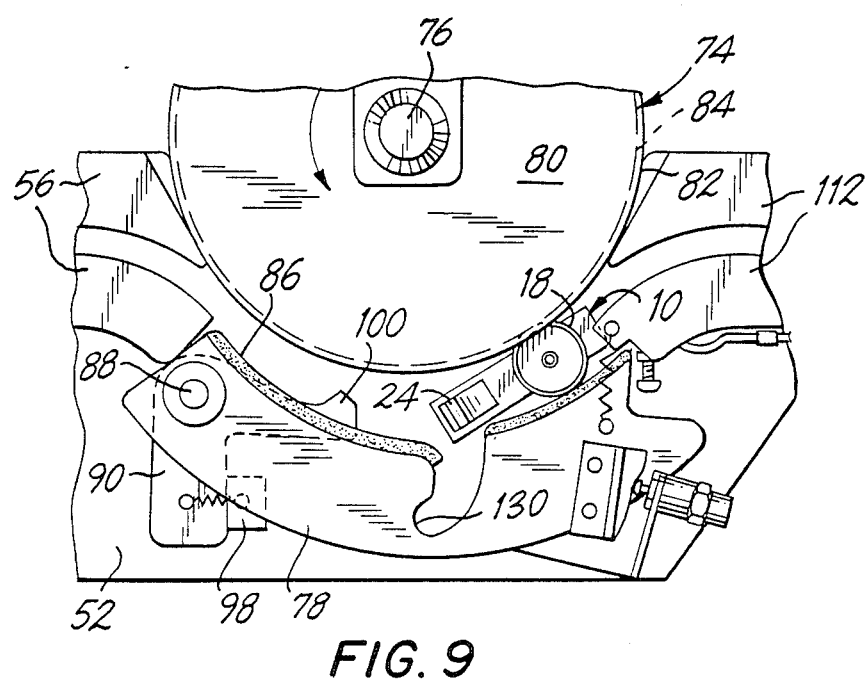
FIG. 9 is a fragmentary view similar to FIG. 7, but with the component parts in still another operating position.

Slot 130 extends outwardly transverse to segment 70 and is curved to enable continued clockwise rotation of pump housing 12 as cap assembly 10 proceeds downstream along path of travel 40, as seen in FIGS. 8 and 9. As pump housing 12 passes beyond pusher member 100, outer section 78 will return to the inner position to compensate for the presence of slot 130 and assure that cap 18 is gripped between drive surface 84 and guide surface 86, as seen in FIG. 8, enabling cap 18 to be driven by drive surface 84 to continue the downstream travel of cap assembly 10 as the pump housing 12 is rotated to bring trigger 24 into a trailing position, relative to cap 18. Further downstream travel of the cap assembly 10 will withdraw the trigger 24 from slot 130, as seen in FIG. 9, and cap assembly 10 will continue downstream in the desired orientation.

It will be seen that orienter 30 accepts serially presented cap assemblies 10 in random orientation and delivers the cap assemblies 10 in the desired orientation with ease and simplicity. The above-described operation is reliable and the arrangement of component parts is adapted readily to cap assemblies having a variety of configurations, utilizing features inherent in the design of the cap assemblies for accomplishing the desired orientation.

It is to be understood that the above detailed description of an embodiment of the invention is provided by way of example only. Various details of design and construction may be modifed without departing from the true spirit and scope of the invention as set forth in the appended claims.

The embodiments of the invention in which an exclusive property or privilege is claimed are defined as follows:

1. An orienter for accepting trigger pump cap assemblies of the type in which a pump housing carries a cap intermediate the front and back ends of the pump housing and a trigger projecting altitudinally from the pump housing at a location spaced longitudinally away from the cap a given longitudinal distance along the pump housing toward the front end of the pump housing, the cap assemblies being presented serially along a prescribed path of travel and oriented randomly in either one of first and second front-to-back orientations, and discharging the cap assemblies in only the second of the orientations, the orienter comprising:

guide means for guiding the cap assemblies along the path of travel, the guide means including guide channel means for receiving the cap and the trigger therein to guide the cap and the trigger along the path of travel with the cap confined within the guide channel means essentially throughout the path of travel;

a pusher member projecting transverse to the guide channel means in a first transverse direction toward the path of travel, at a first location along the path of travel;

a slot extending transverse to the guide channel means in a second transverse direction away from the path of travel and communicating with the guide channel means at a second location along the path of travel; and biasing means biasing the pusher member in the first transverse direction into the path of travel at the first location to engage the pump housing of each cap assembly and urge the pump housing in the first transverse direction;

the slot and the guide channel means being related such that upon the arrival at the second location of the trigger of a cap assembly presented in the first orientation, the cap of that cap assembly will be confined within the guide channel means while the pusher member will move the pump housing transversely to displace the trigger in the second transverse direction into the slot, and the cap of that cap assembly will continue to be confined within the guide channel means as the cap assembly transverse the second location, thereby enabling the pump housing to pivot about the cap until the cap assembly is reoriented into the second orientation.

2. The invention of claim 1 wherein the second location is spaced from the first location a distance along the path of travel.

3. The invention of claim 2 wherein the first transverse direction is opposite to the second transverse direction.

4. The invention of claim 3 wherein in the first orientation the trigger leads the cap as the cap assembly travels downstream along the path of travel and in the second orientation the trigger trails the cap, and the second location is downstream of the first location such that the cap assembly travels downstream during re-orientation into the second orientation.

5. The invention of claim 4 wherein the distance between the first location and the second location is at least somewhat greater than the given longitudinal distance between the trigger and the cap of the cap assembly.

6. The invention of claim 1 wherein the guide channel means includes arcuate guide means for guiding the cap and trigger along an arcuate segment of the path of travel, the pusher member and the slot being located along the arcuate segment.

7. The invention of claim 6 wherein the second location is spaced from the first location along the arcuate segment.

8. The invention of claim 7 wherein the first transverse direction is opposite to the second transverse direction.

9. The invention of claim 8 wherein in the first orientation the trigger leads the cap as the cap assembly travels downstream along the path of travel and in the second orientation the trigger trails the cap, and the second location is downstream of the first location such that the cap assembly travels downstream during reorientation into the second orientation.

10. The invention of claim 9 wherein the first transverse direction extends generally radially inwardly relative to the arcuate segment and the second transverse direction extends generally radially outwardly relative to the arcuate segment.

11. The invention of claim 10 wherein the distance between the first location and the second location is at least somewhat greater than the given longitudinal distance between the trigger and the cap of the cap assembly.

12. The invention of claim 10 wherein the arcuate guide means includes:
   a drive wheel mounted for rotation adjacent the path of travel;
   a peripheral surface on the drive wheel for engaging the cap of each cap assembly as the cap assembly travels along the arcuate segment;
   a guide plate on the drive wheel for engaging the trigger of each cap assembly, the guide plate being juxtaposed with the peripheral surface and spaced altitudinally therefrom; and
   an arcuate section complementary to the peripheral surface and radially confronting the peripheral surface to establish a guide channel along the arcuate segment, within which guide channel the cap of each assembly is confined as the cap assembly travels along the arcuate path.

13. The invention of claim 12 wherein the slot is placed in the arcuate section and extends outwardly from the guide channel.

14. The invention of claim 13 wherein the pusher member extends into the arcuate segment and is juxtaposed with the guide channel altitudinally opposite the guide plate.

15. The invention of claim 14 including pivotal means mounting the pusher member for pivotal movement along the first transverse direction, the pivotal means including a pivot located radially outwardly of the guide channel and the biasing means biasing the pusher member radially inwardly into juxtaposition with the guide channel for engagement with the pump housing of each cap assembly.

16. The invention of claim 15 including further pivotal means mounting the arcuate section for pivotal movement along the first transverse direction, and biasing means biasing the arcuate section toward the peripheral surface on the drive wheel.

* * * * *